United States Patent
Scothern

(10) Patent No.: US 8,721,260 B2
(45) Date of Patent: May 13, 2014

(54) FAN RETENTION SHAFT

(75) Inventor: David P. Scothern, Derby (GB)

(73) Assignee: Rolls-Royce, PLC, London (GB)

( * ) Notice: Subject to any disclaimer, the term of this patent is extended or adjusted under 35 U.S.C. 154(b) by 740 days.

(21) Appl. No.: 12/897,152

(22) Filed: Oct. 4, 2010

(65) Prior Publication Data

US 2011/0085906 A1    Apr. 14, 2011

(30) Foreign Application Priority Data

Oct. 12, 2009 (GB) .................................. 0917787.4

(51) Int. Cl.
*F01D 21/00* (2006.01)

(52) U.S. Cl.
USPC ............................................................ 415/9

(58) Field of Classification Search
USPC ....................................... 415/9, 173.4, 174.4
See application file for complete search history.

(56) References Cited

U.S. PATENT DOCUMENTS 4,201,513 A * 5/1980 Sales .................................. 416/2
4,604,035 A   8/1986 Roberts

FOREIGN PATENT DOCUMENTS

| GB | 2 328 251 A | 2/1999 |
| GB | 2 382 108 A | 5/2003 |
| JP | A-8-135739 | 5/1996 |

OTHER PUBLICATIONS

British Search Report dated Feb. 11, 2010 in British Patent Application No. GB0917787.4.

* cited by examiner

*Primary Examiner* — Dwayne J White
(74) *Attorney, Agent, or Firm* — Oliff PLC

(57) ABSTRACT

A fan retention shaft is provided for retaining a fan within a gas turbine engine in the event of fan shaft failure. The fan retention shaft has a first shaft which in use extends from the engine and a second shaft to which in use the fan is attached, the second shaft being coaxial with the first shaft and the first and second shafts defining an annular passage between them. An energy absorbing medium is disposed within the annular passage. The fan retention shaft has a retaining formation for preventing the first shaft and the second shaft from moving axially with respect to one another. The retaining formation is configured to release the first shaft and the second shaft from their relative axial positions when a threshold axial load is applied to the fan retention shaft. The energy absorbing medium is arranged to absorb kinetic energy from the second shaft as the second shaft moves axially with respect to the first shaft.

12 Claims, 1 Drawing Sheet

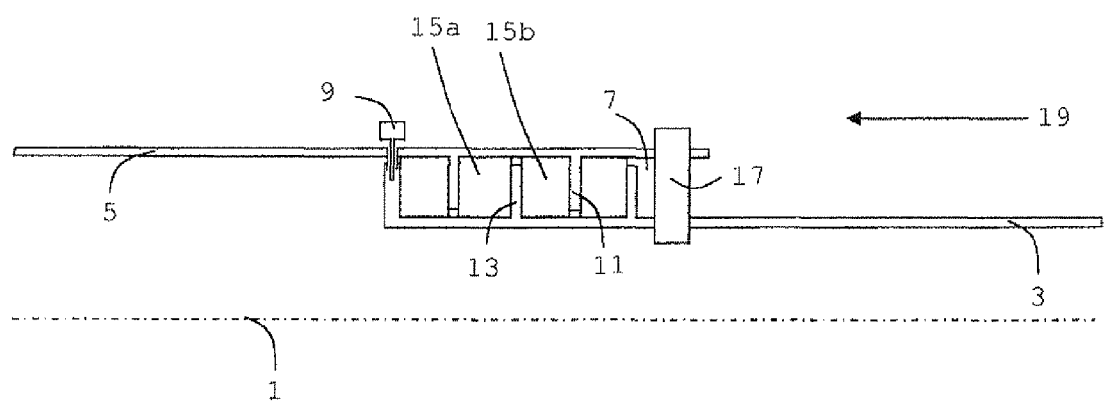

FAN RETENTION SHAFT

FIELD OF THE INVENTION

The present invention relates to a fan retention shaft.

BACKGROUND OF THE INVENTION

Turbofan gas turbine engines have a fan mounted at the front of the engine. The fan increases the volume of air that enters the engine, helping to provide additional thrust.

The fan is situated upstream of the compressor and is mounted on a fan shaft that is driven to rotate by one of the engine turbines. The fan shaft typically encloses a thin-walled "fan retention" shaft mounted coaxially with the fan shaft. The fan retention shaft is designed to retain the fan in the event that the fan shaft should fail, following exposure to an axial overload, for example. The fan retention shaft can absorb impact energy by deforming elastically. In order for the fan retention shaft to fulfil its function, it is necessary to choose a material that has sufficient ductility to absorb the impact energy without breaking. Currently, the materials that satisfy this requirement tend to be heavy and place an extra weight burden on the engine, leading to reduced engine efficiency.

There is thus a continuing need to develop fan retention shafts for use in gas turbine engines.

SUMMARY OF THE INVENTION

Thus, according to the present invention, there is provided a fan retention shaft for retaining a fan within a gas turbine engine in the event of fan shaft failure, the fan retention shaft having:
- a first shaft which in use extends from the engine,
- a second shaft to which in use the fan is attached, the second shaft being coaxial with the first shaft and the first and second shafts defining an annular passage therebetween,
- an energy absorbing medium disposed within the annular passage, and
- a retaining formation for preventing the first shaft and the second shaft from moving axially with respect to one another,
- wherein the retaining formation is configured to release the first shaft and the second shaft from their relative axial positions when a threshold axial load is applied to the fan retention shaft, the energy absorbing medium being arranged to absorb kinetic energy from the second shaft as the second shaft moves axially with respect to the first shaft.

Advantageously, the energy absorbing medium can help to reduce the peak load and energy transmitted by the fan retention shaft in the event of an axial shock load on one of the shafts. As the medium absorbs energy from the shock, the energy that must be absorbed by the rest of the fan retention shaft assembly can be reduced, and a separate fan retention shaft may no longer be required. A wider range of materials can also be used for manufacturing the fan retention shaft itself. In particular, it may be possible to use light-weight materials, whose brittleness would otherwise preclude their being considered for such an application.

The fan retention shaft may include any one or, to the extent that they are compatible, any combination of the following optional features.

The energy absorbing medium may absorb the kinetic energy by being crushed as the second shaft moves axially with respect to the first shaft. Crushing the energy absorbing medium can help to cushion the impact of the load by increasing the duration of the impact between the shafts and the energy absorbing medium. Using a crushable medium can also help to increase the amount of energy that can be absorbed by the energy absorbing medium given the volume available in the passage.

The energy absorbing medium may be a foam. Using a foam can help to reduce the weight of the energy absorbing medium.

The energy absorbing medium may have a honeycomb structure. The honeycomb structure can help to ensure energy is absorbed efficiently by the energy absorbing medium, whilst still providing a light-weight structure for the medium. In addition, using a honeycomb structure can help to ensure the energy absorbing medium is crushed uniformly, thereby maximising the absorbed energy and reducing damage to the surrounding structure. The total area and stiffness of the honeycomb structure can be tuned to provide optimum energy absorbing properties. Typically, the walls of the honeycomb structure are formed of aluminium or aluminium alloy.

The cells of the honeycomb structure may contain liquid (such as oil) or visco-foam. Inserting liquid or visco-foam into the honeycomb cells can help to convert impact energy into heat as the liquid or visco-foam is squeezed along or out of the deforming cells, and so increases the amount of energy that can be absorbed by the honeycomb.

The first shaft and second shaft may have respective protruding members that protrude into the annular passage, the protruding members crushing the energy absorbing medium as the second shaft moves axially with respect to the first shaft. The protruding members can help to transfer the load from the shafts to the energy absorbing medium effectively.

The protruding members may be provided by helical threads on opposing walls of the annular passage, the energy absorbing medium occupying the volume between the threads. This arrangement conveniently allows, for example, a spiral body or spiral bodies of the energy absorbing medium to be screwed into the volume between the threads, thereby facilitating the fitting of the energy absorbing medium to the fan retention shaft.

Alternatively, the protruding members may be provided by circular flanges extending from opposing walls of the annular passage. The energy absorbing medium may then comprise one or more rings coaxial with the first and second shafts. For example, the energy absorbing medium may comprise a plurality of rings disposed at intervals along the passage, the rings being separated by successive flanges. Using one or more circular flanges, rather than helical threads, can help to prevent the two shafts from unwinding in the event that one experiences a high level of torque relative to the other.

The energy absorbing medium may be a fluid, and the fan second shaft may have one or more orifices through which the fluid is forced as the second shaft moves axially with respect to the first shaft. The energy absorbed by the fluid can be transferred to heat as the fluid is forced through the orifice. Preferably, the fluid is oil.

The retaining formation may be one or more pins connecting the first shaft to the second shaft. The pin strength can be chosen such that the pin(s) will deform or shear when the axial load on the second shaft reaches a threshold, thereby allowing the second shaft to move axially with respect to the first shaft and so transfer energy to the energy absorbing medium.

The fan retention shaft may have a further retaining formation for preventing the first shaft and the second shaft from rotating with respect to one another. The second retaining formation may be a key that is inserted into a keyway in the two shafts. The further retaining formation may be particularly beneficial when the protruding members are provided by helical threads on opposing walls of the annular passage, as the formation can help to prevent the two shafts from unwinding in the event that one experiences a high level of torque relative to the other.

The first and second shafts may be formed of carbon fibre reinforced polymer. Using carbon fibre reinformed polymer can help to reduce the overall weight of the fan retention shaft and so increase the engine efficiency in aerospace applications.

A second aspect of the invention provides a combination of a fan shaft and a fan retention shaft according to the first aspect of the invention, the fan retention shaft being coaxial with the fan shaft, and the fan retention shaft optionally having any one or any combination of the optional features described above in relation to the first aspect.

A third aspect of the invention provides a gas turbine engine having a fan retention shaft according to the first aspect of the invention, the fan retention shaft optionally having any one or any combination of the optional features described above in relation to the first aspect. Typically, the engine is an aeroengine.

BRIEF DESCRIPTION OF THE DRAWINGS

Embodiments of the invention will now be described by way of example with reference to the accompanying drawing in which:

FIG. 1 shows a schematic of a fan retention shaft according to an embodiment of the present invention.

DETAILED DESCRIPTION

FIG. 1 shows a schematic of a fan retention shaft according to an embodiment of the present invention. The fan retention shaft is rotatable about an axis 1, and comprises a first shaft 3 and a second shaft 5 of larger diameter, the two shafts being coaxial with one another. The first and second shafts overlap to define an annular passage 7 between them.

A fan is connected at the far end of the second shaft 5. The opposite end of the first shaft 3 is coupled to the low pressure turbine of a gas turbine engine that causes the fan retention shaft to rotate, thereby driving the fan. The two shafts can be prevented from rotating relative to one another by an optional key 9 that is inserted in a keyway between the two shafts.

The first shaft has an external thread 11 that protrudes into the annular passage. The second shaft has an internal thread 13 that also protrudes into the annular passage. The threads are configured such that when the shafts are assembled an axial gap is formed between the respective protrusions of the two threads.

Two spiral bodies 15a, 15b of an energy absorbing medium are disposed inside the annular passage, and occupy the volume between the threads on the two shafts. In the present embodiment, the energy absorbing medium is a honeycomb material. The spiral bodies can be easily screwed into the annular passage between the threads.

The first and second shafts are retained axially with respect to one another by a pin 17 of pre-determined strength. Particularly when optional key 9 is not used, the pin may be configured to have anti-rotation capability. The pin acts as a load limiting device, preventing the shafts from moving axially with respect to one another under normal service loads. When an axial load 19 exceeding a threshold load is applied to one of the shafts, the pin deforms or shears, allowing relative axial movement to occur between the first and second shafts. As the shafts move relative to one another, the threads engage with one of the spiral bodies, compressing and ultimately crushing the honeycomb structure as the gap between protrusions becomes smaller. Kinetic energy is thereby transferred from the shafts to the honeycomb, reducing the peak load that is transmitted by the shafts. If the shafts move in the opposite axial direction relative to one another, the honeycomb structure of the other spiral body is crushed.

The first 3 and second 5 shafts can be formed of carbon fibre reinforced polymer to reduce the weight of the fan retention shaft.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fan retention shaft for retaining a fan within a gas turbine engine in the event of fan shaft failure, the fan retention shaft having:
   a first shaft which in use extends from the engine,
   a second shaft to which in use the fan is attached, the second shaft being coaxial with the first shaft and the first and second shafts defining an annular passage therebetween,
   an energy absorbing medium disposed within the annular passage, and
   a retaining formation for preventing the first shaft and the second shaft from moving axially with respect to one another,
   wherein the retaining formation is configured to release the first shaft and the second shaft from their relative axial positions when a threshold axial load is applied to the fan retention shaft, the energy absorbing medium being arranged to absorb kinetic energy from the second shaft as the second shaft moves axially with respect to the first shaft,
   wherein the energy absorbing medium absorbs the kinetic energy by being crushed as the second shaft moves axially with respect to the first shaft, and
   wherein the energy absorbing medium comprises a foam.

2. The fan retention shaft according to claim 1, wherein the energy absorbing medium has a honeycomb structure.

3. The fan retention shaft according to claim 2, wherein the cells of the honeycomb structure contain liquid or visco-foam.

4. The fan retention shaft according to claim 1, wherein the first shaft and second shaft have respective protruding members that protrude into the annular passage, the protruding members crushing the energy absorbing medium as the second shaft moves axially with respect to the first shaft.

5. The fan retention shaft according to claim 4, wherein the protruding members are provided by helical threads on opposing walls of the annular passage, the energy absorbing medium occupying the volume between the threads.

6. The fan retention shaft according to claim 1, wherein the energy absorbing medium is a fluid, and the fan retention shaft has one or more orifices through which the fluid is forced as the second shaft moves axially with respect to the first shaft.

7. The fan retention shaft according to claim 1, wherein the retaining formation is one or more pins connecting the first shaft to the second shaft.

8. The fan retention shaft according to claim 1, having a further retaining formation for preventing the first shaft and the second shaft from rotating with respect to one another.

9. The fan retention shaft according to claim 1, wherein the first and second shafts are formed of carbon fibre reinforced polymer.

10. A gas turbine engine having a fan retention shaft according to claim 1.

11. A fan retention shaft for retaining a fan within a gas turbine engine in the event of fan shaft failure, the fan retention shaft having:
- a first shaft which in use extends from the engine,
- a second shaft to which in use the fan is attached, the second shaft being coaxial with the first shaft and the first and second shafts defining an annular passage therebetween,
- an energy absorbing medium disposed within the annular passage, and
- a retaining formation for preventing the first shaft and the second shaft from moving axially with respect to one another,
- wherein the retaining formation is configured to release the first shaft and the second shaft from their relative axial positions when a threshold axial load is applied to the fan retention shaft, the energy absorbing medium being arranged to absorb kinetic energy from the second shaft as the second shaft moves axially with respect to the first shaft,
- wherein the energy absorbing medium absorbs the kinetic energy by being crushed as the second shaft moves axially with respect to the first shaft, and
- wherein the first shaft and second shaft have respective protruding members that protrude into the annular passage, the protruding members crushing the energy absorbing medium as the second shaft moves axially with respect to the first shaft.

12. A fan retention shaft for retaining a fan within a gas turbine engine in the event of fan shaft failure, the fan retention shaft having:
- a first shaft which in use extends from the engine,
- a second shaft to which in use the fan is attached, the second shaft being coaxial with the first shaft and the first and second shafts defining an annular passage therebetween,
- an energy absorbing medium disposed within the annular passage, and
- a retaining formation for preventing the first shaft and the second shaft from moving axially with respect to one another,
- wherein the retaining formation is configured to release the first shaft and the second shaft from their relative axial positions when a threshold axial load is applied to the fan retention shaft, the energy absorbing medium being arranged to absorb kinetic energy from the second shaft as the second shaft moves axially with respect to the first shaft, and
- wherein the energy absorbing medium is a fluid, and the fan retention shaft has one or more orifices through which the fluid is forced as the second shaft moves axially with respect to the first shaft.

* * * * *